US012560095B2

(12) United States Patent
Boncinelli et al.

(10) Patent No.: US 12,560,095 B2
(45) Date of Patent: Feb. 24, 2026

(54) NOZZLE SECTOR

(71) Applicant: NUOVO PIGNONE TECNOLOGIE—S.R.L., Florence (IT)

(72) Inventors: Marco Boncinelli, Florence (IT); Simone Colantoni, Florence (IT); Paolo Del Turco, Florence (IT); Vincenzo Di Marco, Florence (IT); Giacomo Ragni, Florence (IT); Filippo Ceccanti, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/837,373

(22) PCT Filed: Feb. 15, 2023

(86) PCT No.: PCT/EP2023/025065
§ 371 (c)(1),
(2) Date: Aug. 9, 2024

(87) PCT Pub. No.: WO2023/156063
PCT Pub. Date: Aug. 24, 2023

(65) Prior Publication Data
US 2025/0237147 A1 Jul. 24, 2025

(51) Int. Cl.
*F01D 9/04* (2006.01)

(52) U.S. Cl.
CPC ............. *F01D 9/041* (2013.01); *F01D 9/047* (2013.01); *F05D 2240/128* (2013.01);
(Continued)

(58) Field of Classification Search
CPC . F01D 9/04; F01D 9/041; F01D 9/047; F01D 11/005; F05D 2240/128;
(Continued)

(56) References Cited

U.S. PATENT DOCUMENTS 4,840,539 A 6/1989 Bourcier et al.
5,743,711 A 4/1998 Fournier et al.
(Continued)

FOREIGN PATENT DOCUMENTS

CN 113027536 A 6/2021
EP 2808491 A1 5/2013
(Continued)

*Primary Examiner* — Sang K Kim
(74) *Attorney, Agent, or Firm* — Paul Frank + Collins P.C.

(57) ABSTRACT

A nozzle sector for a sectorized annular stator of a gas turbine, comprising an inner platform and an outer platform, said inner platform and said outer platform being substantially concentric with respect to turbine rotational axis and spaced apart from each other by at least an airfoils, wherein each one of said inner platform and said outer platform has a platform leading edge, a platform trailing edge and a first and a second platform sidewall edge, each one of said sidewall edges being extending from said platform leading edge to said platform trailing edge of the respective platform, wherein each one of said first and said second sidewall edges has a leading portion, a trailing portion, and an intermediate portion comprised between said leading portion and said trailing portion.

20 Claims, 4 Drawing Sheets

(52) U.S. Cl.
CPC ...... *F05D 2240/80* (2013.01); *F05D 2250/32* (2013.01); *F05D 2250/38* (2013.01); *F05D 2300/175* (2013.01)

(58) Field of Classification Search
CPC ............. F05D 2240/80; F05D 2250/32; F05D 2250/38; F05D 2300/175
See application file for complete search history.

(56) References Cited

U.S. PATENT DOCUMENTS

| | | | | |
|---|---|---|---|---|
| 6,375,415 | B1 * | 4/2002 | Burdgick | F01D 25/246 415/114 |
| 9,086,078 | B2 * | 7/2015 | Nakayama | F01D 25/246 |
| 9,551,224 | B2 * | 1/2017 | Onishi | F01D 9/042 |
| 2003/0044282 | A1 | 3/2003 | Zhu et al. | |
| 2008/0170939 | A1 * | 7/2008 | Palmer | F01D 25/246 415/209.2 |
| 2021/0087936 | A1 | 3/2021 | D 'Ettole | |

FOREIGN PATENT DOCUMENTS

| | | | |
|---|---|---|---|
| EP | 3 043 028 | A1 | 7/2016 |
| EP | 3 064 295 | A1 | 9/2016 |
| EP | 3 441 568 | A1 | 2/2019 |

* cited by examiner

NOZZLE SECTOR

TECHNICAL FIELD

The present disclosure concerns a nozzle sector for a sectorized annular stator of a gas turbine shaped to have a lateral edge shaped as a S-shape or Z-shape, which allows a reduction of the width of the component, intended as a circumferential extension of the nozzle sector. Furthermore, the reduction of the width of the component allows the printability of the nozzle sector by means of smaller additive manufacturing printers.

BACKGROUND

The annular stator of a gas turbine is generally formed by an entire annular element, or suitably divided into a plurality of sectors.

The stator to which the present invention refers comprises a plurality of sectors, assembled together to form a sectorized annular stator.

The annular stator is sectorized, being made by means of a plurality of nozzle sectors arranged circumferentially coupled to each other face to face along a ring-shaped edge, around a main axis of the stator, coincident to a rotation axis of the gas turbine. Each nozzle sector can comprise two platforms, namely an inner platform and an outer platform, and at least one airfoil arranged in the space between the platforms. The airfoil conditions a flow of fluids, the flow of fluid coming into contact with the surface of the airfoil at an airfoil leading edge, flowing along the surface of the body of the airfoil and leaving the surface of the airfoil at an airfoil trailing edge.

The installation of the sectorized annular stator requires a circumferential coupling of the nozzles sector which therefore provide complementary lateral edges.

The nozzles of the prior art are subject to deformations due to the thermal gradients and to the loading stresses during the functioning of the turbine. In order to guarantee the life requirement of the sector, the coupling between nozzle sectors is performed to accommodate the airfoil shape, thus the nozzle sectors of the prior art comprise platform sidewall edges tilted with respect to a platform leading edge and a platform trailing edge of an outer platform and an inner platform of the nozzle sector.

So, the width (intended as the extension measured along the circumferential direction of the stator) of the nozzle sectors of the prior art is determined by the inclination of the platform sidewall edges with respect to the platform leading edge and the platform trailing edge of the inner and outer platforms.

A first disadvantage is that the nozzle sectors of the prior art are subject to a deformation due to the specific conformation and the distance between the ending portion of the platforms and the leading edges and trailing edges of the airfoils provided between the platforms.

Due to the thermal gradients and the loading stresses, a non-uniform deformation is provided on the surfaces of the nozzle sector.

Another disadvantage is that this reduced the useful life of the component as there is the possible danger of friction between the nozzle sectors and the shroud, due to the deformation.

A further disadvantage is that a deformation of the leading and trailing portions of the platforms involves an increase in the clearances between coupled nozzle sectors and allows a passage of air through the nozzle sectors which determines a loss of efficiency and/or performance of the turbine.

EP3043028 discloses a nozzle sector comprising at least one airfoil and a platform, the platform including a platform leading edge, a platform trailing edge, a first platform sidewall edge or first platform circumferential edge and a second platform sidewall edge or second platform circumferential edge. The first platform circumferential edge and the second platform circumferential edge of the platform are both swept such that a central circumferential axis forms a substantially rounded or squared S shape. The platform is coupled to the airfoil and configured to partially rotate in response to the airfoil be coming loaded. Because platforms rotate in response to airfoils becoming loaded, the swept circumferential edges reduce the size of gaps between adjacent nozzle sectors, thus reducing the amount of leakage fluid flowing between nozzle sectors.

However, nozzles sector of the prior art, including those according to EP3043028, due to their encumbrance, require plate printers dimensions out of the standards in the additive manufacturing process.

SUMMARY

Therefore, the technical problem posed and solved by the present invention is that of providing a nozzle sector for a sectorized annular stator of a gas turbine which allows to overcome the drawbacks mentioned above with reference to the known art.

An objective of the present invention is to provide a reduction of the total width of the nozzle sector without modifying its main functionality.

Another objective is to provide a nozzle sector for a turbine stator which has a greater dimensional stability when operating.

Yet another objective is to provide a processing method to obtain the sector nozzle which is simple and economical.

A further objective is to provide a reduction of processing time and a reduction of the powder used in the additive manufacturing process, in order to obtain a reduction component's cost.

These objectives according to the present invention are achieved by providing a nozzle sector of a sectorized annular stator of a gas turbine as specified in claim 1.

Further characteristics of the invention are indicated in the subsequent claims.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

An annular stator of a gas turbine can be divided into a plurality of sectors. In particular, a sectorized annular stator can be obtained by means of a plurality of nozzle sectors arranged circumferentially coupled to each other face to face along a ring-shaped edge, around a main axis of the stator, coincident to a rotation axis of the gas turbine.

Figure 1:
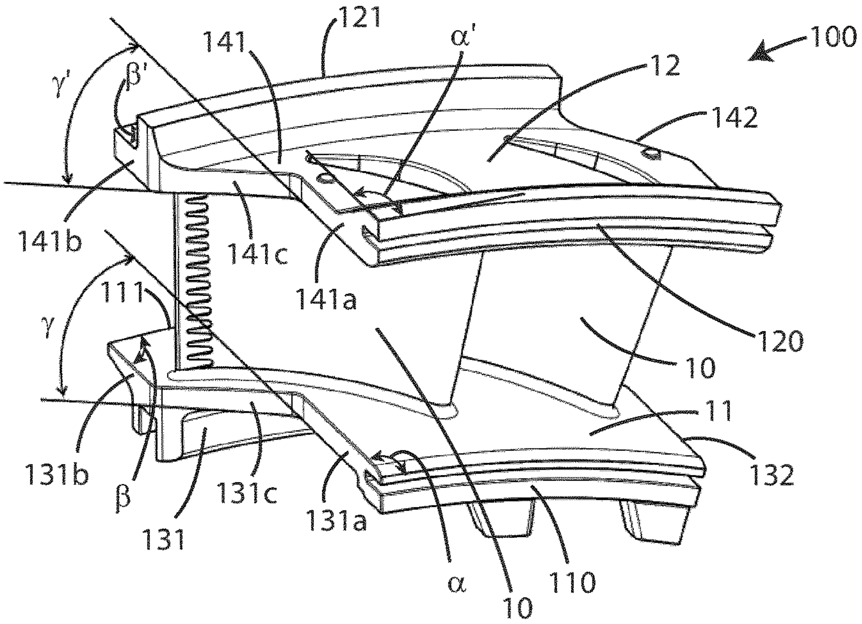
FIG. 1 illustrates a perspective view of a nozzle sector according to a first embodiment.

Referring to FIG. 1, it is illustrated a nozzle sector for a sectorized annular stator of a gas turbine, wholly indicated by the reference number 100, that comprises an inner platform 11 and an outer platform 12, wherein the inner platform 11 and the outer platform 12 are substantially concentric with respect to turbine rotational axis and spaced apart from each other in order to define between them an annular passage for the gas flow of the turbine.

The inner platform 11 and the outer platform 12 of the nozzle sector 100 are spaced apart from each other by at least an airfoils 10 positioned, in an assembling configuration, along a substantially radial direction of the gas turbine.

The inner platform 11 has a platform leading edge 110, a platform trailing edge 111 and a first 131 and a second 132 platform sidewall edge, each one of the platform sidewall edges being extending from the platform leading edge 110 to the platform trailing edge 111 of the inner platform 11.

The outer platform 12 has a platform leading edge 120, a platform trailing edge 121 and a first 141 and a second 142 platform sidewall edge, each one of said platform sidewall edges being extending from the platform leading edge 120 to the platform trailing edge 121 of the outer platform 12.

Advantageously, the first platform sidewall edge 131 of the inner platform 11 has a leading portion 131*a* forming an angle α with respect to the platform leading edge 110, a trailing portion 131*b* forming an angle β with respect to the platform trailing edge 111, and an intermediate portion 131*c* comprised between the leading portion 131*a* and the trailing portion 131*b*, the intermediate portion 131*c* being tilted which respect to the leading portion 131*a* of an angle γ.

In the same way, the first platform sidewall edge 141 of the outer platform 12 has a leading portion 141*a* forming an angle α' with respect to the platform leading edge 120, a trailing portion 141*b* forming an angle β' with respect to the platform trailing edge 121, and an intermediate portion 141*c* comprised between the leading portion 141*a* and the trailing portion 141*b*, the intermediate portion 141*c* being tilted which respect to the leading portion 141*a* of an angle γ'.

The second sidewall edges 132, 142, of each platform 11, 12, are complementary in shape with the above mentioned first platform sidewall edge 131, 141, in order to allow a coupling between a sequence of nozzles sectors along a ring-shaped edge, around a main axis of the stator.

Figure 2:
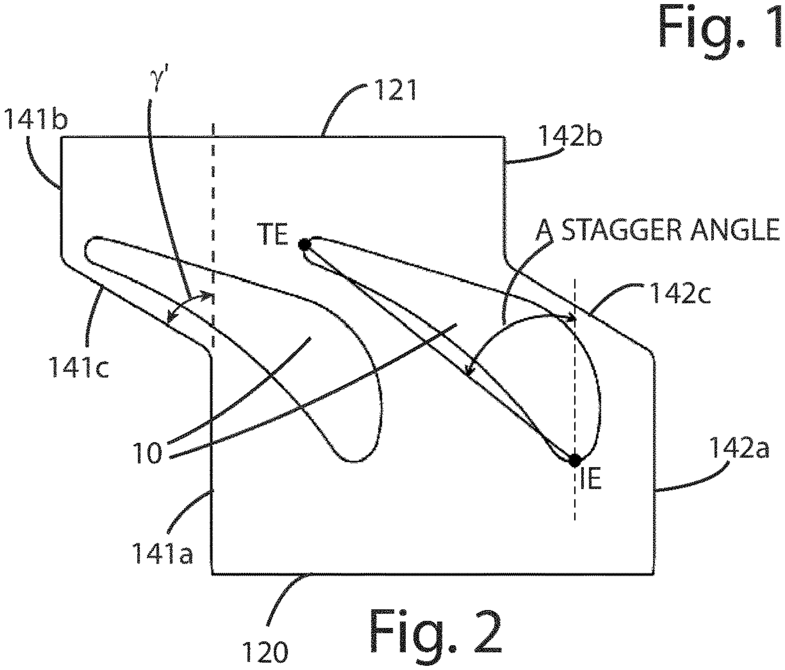
FIG. 2 illustrates a schematic view from above of FIG. 1.
Figure 3:
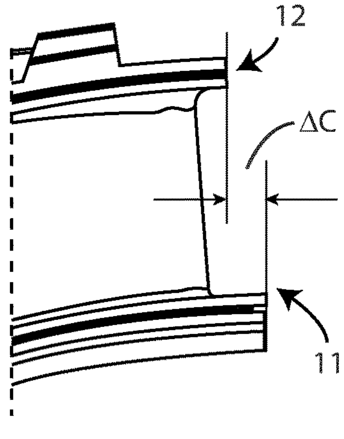
FIG. 3 illustrates a schematic representation of a particular of a frontal view of FIG. 1.

As illustrated in FIG. 2 and FIG. 3, advantageously, at least one of the first 141 and/or second 142 platform sidewall edge of the outer platform 12 is circumferentially spaced apart of a value ΔC, respectively, from the first 131 and/or second 132 platform sidewall edge of the inner platform 11, allowing independent optimization of parameters.

Each angle α and α' is comprised between 70 degrees and 110 degrees, preferably is equal to 90 degrees. More preferably, the angle α' is equal to the angle α.

Advantageously, each angle β and β' is comprised between 70 degrees and 110 degrees and preferably is equal to 90 degrees. More preferably, the angle β' is equal to the angle β.

Each angle γ and γ' is comprised in a range of plus or minus 20 degrees to the value of the stagger angle A. In particular, each angle γ and γ' is comprised between 35 degrees and 55 degrees, optionally is equal to 45 degrees.

As illustrated in FIG. 2, in a first embodiment, the angle γ' is equal to a stagger angle A. The stagger angle A is the angle between the chord of the airfoil profile and the axial direction. The chord is the line between Leading Edge (LE) and Trailing Edge point (TE).

Preferably, the angle γ is equal to the angle γ'.

Figure 6:
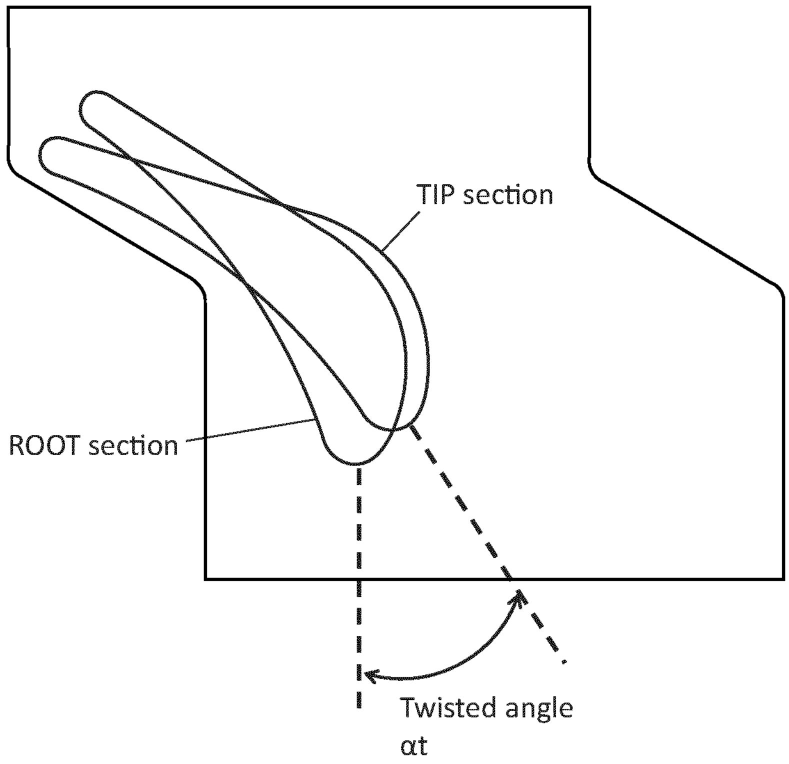
FIG. 6 illustrates a schematic representation from above of a twist along a blade of a nozzle according a further embodiment.
Figure 7:
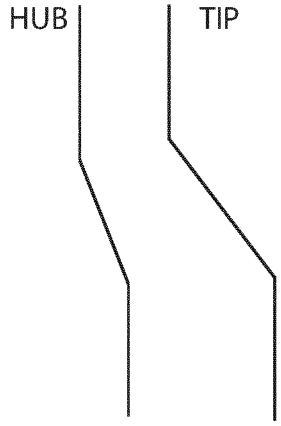
FIG. 7 illustrates a schematic representation of a sidewall edge of an outer platform and of a first sidewall edge of an inner platform of the nozzle of FIG. 6.
Figure 8:
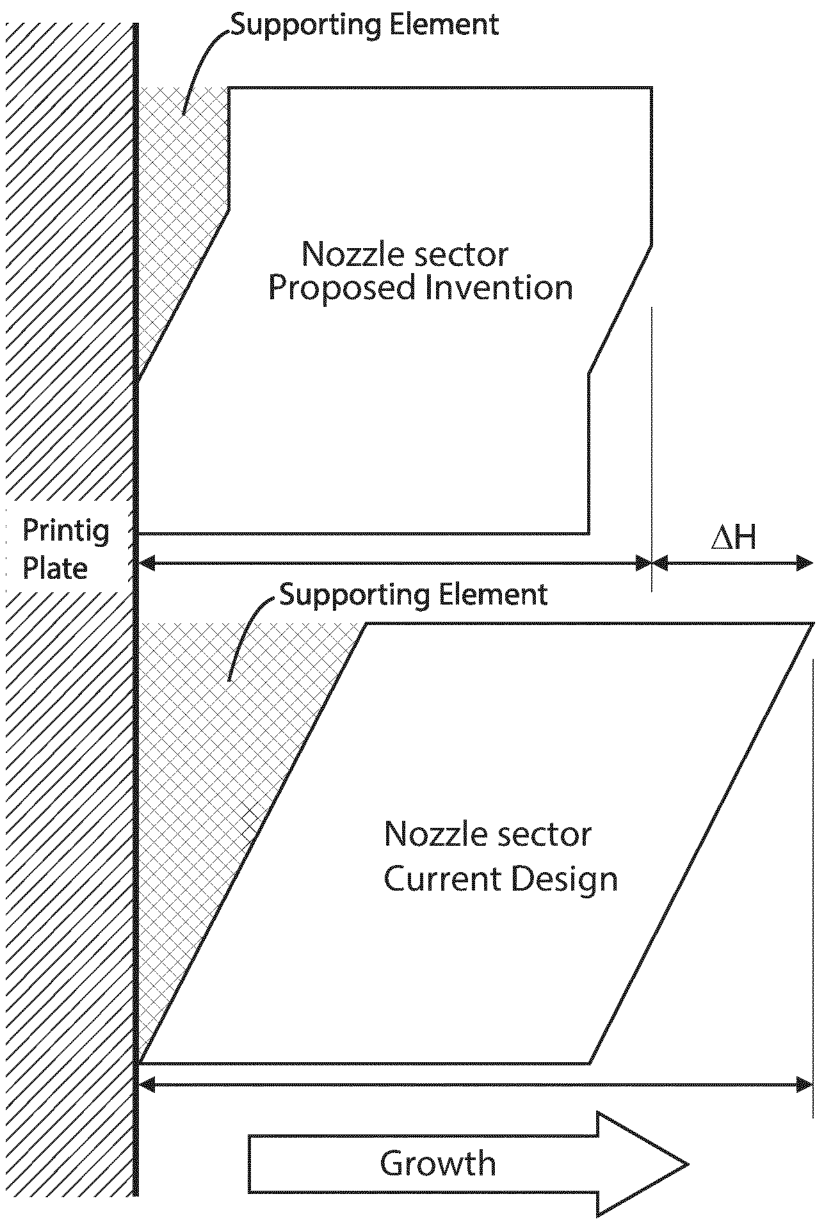
FIG. 8 illustrates a schematic representation of the encumbrance of a nozzle of the prior art and a nozzle according to the invention, both on an additive manufacturing process printing plate.

In the embodiment wherein the nozzle comprises a twist along the blade length, as illustrated in FIG. 6, the value of the angle γ is different from the value of the angle γ' and at least the intermediate portion 131*c* of the first sidewall edge 131 of the inner platform 11 is differently tilted with respect of the intermediate portion 141*c* of the first sidewall edge 141 of the outer platform 12, as illustrated in FIG. 7 (wherein the first sidewall edge of the outer platform and the first sidewall edge of the inner platform are respectively denotated as TIP and HUB).

Advantageously, the first sidewall edge 131, 141 and the second sidewall edges 132, 142, of each platform 11, 12, can be indicated as "Z-shaped" or "S-shaped".

Figure 4A:
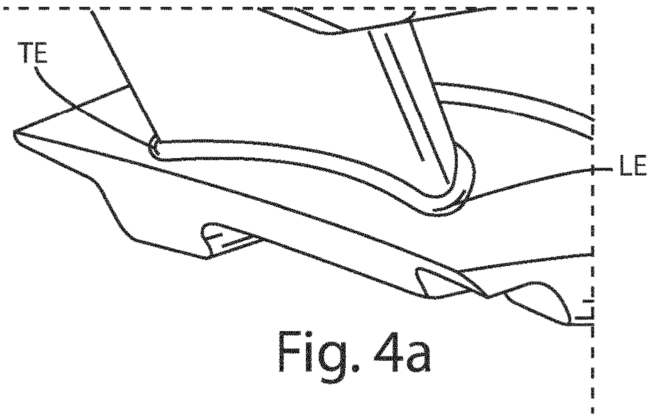
FIG. 4*a* illustrates a schematic representation of a sidewall edge of a nozzle of the prior art.
Figure 4B:
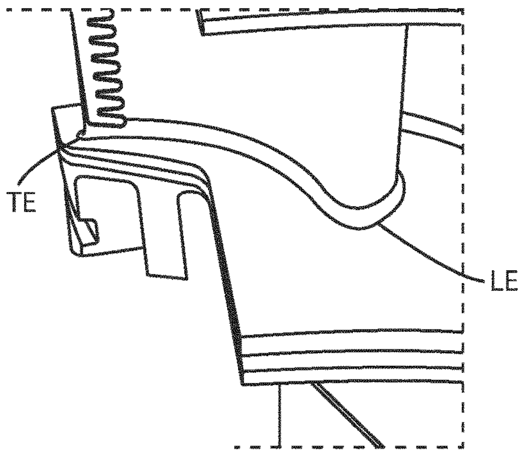
FIG. 4*b* illustrates a schematic representation of a sidewall edge of the nozzle of FIG. 1.

As illustrated in FIG. 4*b*, the shape of the platform sidewall edges of the nozzle sector according to the invention allows moving segment ends of each platform independently on the position of the leading edge and/or trailing edge side of the airfoil 10, with the benefit of reducing peak stresses on most critical locations of the nozzle, without affecting others. Differently, as shown in FIG. 4*a*, in the nozzle of the prior art, a reduction in the distance between the platform sidewall edge profile and the airfoil leading edge, imply an increase in the distance between the platform sidewall edge profile and the airfoil trailing edge. In other terms, the standard cut of the platform sidewall edge in the nozzle sectors of the prior art allows only a change in angle, so if the platform size was reduced on one side, i.e. on the airfoil leading edge side, it was also increased on the other side, i.e. on the airfoil trailing edge side.

Figure 5A:
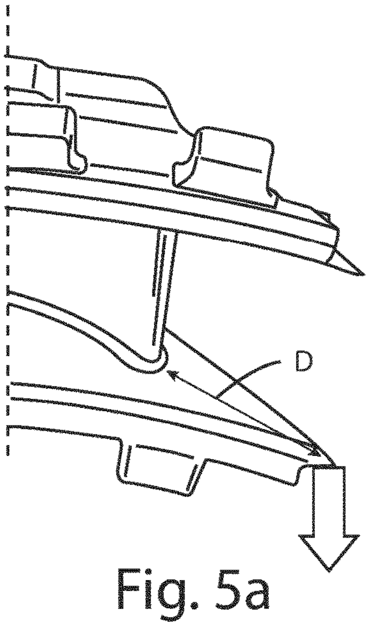
FIG. 5*a* illustrates a schematic representation of a radial deformation at a portion of a nozzle of the prior art.
Figure 5B:
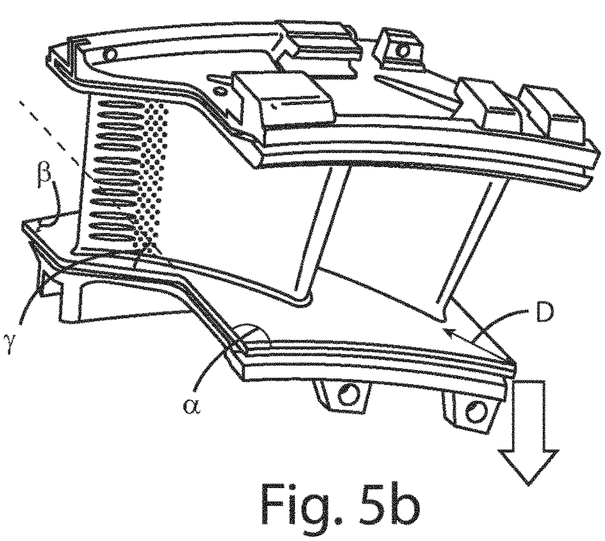
FIG. 5*b* illustrates a schematic representation of a circumferential deformation at a portion of the nozzle of FIG. 1.

In the nozzle segment of the prior art, as shown in FIG. 5*a*, the long distance D between the airfoil and the corner between the platform leading edge and the platform sidewall edge of each platform leads to high deformations. As shown in FIG. 5*b*, the shape of the nozzle sector according to the invention allows a reduction of the above mentioned distance D, in order to manage platforms cantilevered plates and to optimize their stiffness and deflection.

More specifically, the nozzle sector 100 according to the present invention is obtainable by additive manufacturing (AM) process, optionally by Direct Metal Laser Melting (DMLM) process.

The Direct Metal Laser Melting (DMLM) process is an additive manufacturing process that uses lasers to melt ultra-thin layers of metal powder to build three-dimensional objects. Parts are built directly from a file generated from CAD (computer-aided design) data. The file generated from CAD is converted to a sliced file through our machine software, which is uploaded to a machine for the build process. The use of a laser to selectively melt thin layers of tiny particles yields objects exhibiting fine, dense and homogeneous characteristics.

The DMLM process begins with a recoater spreading a thin layer of metal powder on the print bed. Next, the sliced file generated lays down the scan paths that control the exposure of the laser to melt the powder and create a cross-section of the object. The print bed is then lowered so the process can be repeated to create the next layer. After all layers are printed, the excess unmelted powder is brushed, blown or blasted away. The final part sometimes requires little, if any, finishing.

The power and precision of lasers used in the DMLM process make it possible to use extremely durable metals delivered as fine powders. Machines using Direct Metal Laser Melting produce elaborate yet super-strong parts as the nozzle of the present invention.

The metal powder can been selected from titanium, stainless steel, super alloys or aluminum.

Titanium is one of the most popular materials used in the Direct Metal Laser melting process. Titanium parts endure high pressures and temperature extremes.

Since stainless steel is known for its strength, toughness and ductility, it is frequently used to print functional prototypes and production parts. When low-carbon content is required, 316L stainless steel is an option. It is a tough, ductile, weldable compound that is highly resistant to pitting and corrosion.

Alloy718 is a nickel-based superalloy with properties usually required in rocket and jet engines. Its heat and corrosion resistance also make it ideal for use in various chemical industry applications. CoCr F75 is a cobalt-based superalloy offering high-temperature resistance and toughness.

Aluminum alloys possess excellent fusion characteristics that are important in additive manufacturing. DMLM is used to create hard aluminum objects capable of handling significant loads.

Advantageously, the shape of the nozzle sectors according to the present invention allows a reduction in width reduction of the nozzle sector which provide a height reduction of the nozzle sector on the DMLM printing plate, as shown in FIG. 6.

The reduction of the nozzle sector in the growth direction on the printing plate leads to a reduction of printing time and overall height of printed part (i.e. supporting element and nozzle), with a consequent reduction of component's cost and of powder used. In particular, as shown in FIG. 6, the height saved ($\Delta H$) on the printer plate is the 20-30% of the total height of the printer plate of the nozzle sector of the prior art.

The present invention is directed also to a gas turbine comprising a sectorized annular stator, wherein said annular stator comprises a sequence of nozzle sectors as described above, circumferentially coupled to each other.

While aspects of the invention have been described in terms of various specific embodiments, it will be apparent to those of ordinary skill in the art that many modifications, changes, and omissions are possible without departing from the spirit and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure, or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures, or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A nozzle sector for a sectorized annular stator of a gas turbine having a rotational axis, the nozzle sector comprising:

an inner platform;

an outer platform; and an airfoil disposed between the inner platform and the outer platform, wherein the inner platform and the outer platform are concentric with the rotational axis of the gas turbine, wherein each of the inner platform and the outer platform has a platform leading edge, a platform trailing edge, a first platform sidewall edge, and a second platform sidewall edge, wherein each of the first platform sidewall edge and the second platform sidewall edge extends from the platform leading edge to the platform trailing edge of the respective platform, wherein the first platform sidewall edge and the second platform sidewall edge are complementary to each other, wherein each of the first platform sidewall edge and the second platform sidewall edge has a leading portion forming a first angle with respect to the platform leading edge, a trailing portion forming a second angle with respect to the platform trailing edge, and an intermediate portion that extends between the leading portion and the trailing portion, wherein the intermediate portion is tilted with respect to the leading portion of by a third angle, and wherein the first angle is between 70 degrees and 110 degrees, wherein the second angle is between 70 degrees and 110 degrees, wherein the third angle is in a range of plus or minus 20 degrees to of a stagger angle A of the airfoil, and wherein the second platform sidewall edge of the outer platform is circumferentially offset from the second platform sidewall edge of the inner platform.

2. The nozzle sector according to claim 1, wherein the first platform sidewall edge of the outer platform is circumferentially offset from the first platform sidewall edge of the inner platform.

3. The nozzle sector of claim 1, wherein the inner platform, the outer platform, and the airfoil are made of metal powder.

4. The nozzle sector of claim 1, wherein the inner platform, the outer platform, and the airfoil are made of titanium.

5. A gas turbine, comprising:
a sectorized annular stator comprising the nozzles sector of claim 1.

6. A gas turbine, comprising:
a sectorized annular stator comprising a plurality of the nozzle sector of claim 1.

7. The nozzle sector of claim 6, wherein the nozzle sector comprises stainless steel.

8. The nozzle sector of claim 6, wherein the nozzle sector comprises super alloys.

9. The nozzle sector of claim 6, wherein the nozzle sector comprises aluminum.

10. The nozzle sector of claim 1, wherein the first sidewall edge and the second sidewall edge of both the inner platform and the outer platform have a z-shape.

11. A gas turbine, comprising:
a sectorized annular stator comprising a plurality of the nozzle sector of claim 1,
wherein adjacent ones of the plurality of the nozzle sector are coupled to one another.

12. A gas turbine, comprising:
a sectorized annular stator comprising a plurality of the nozzle sector of claim 1, wherein the first sidewall edge and the second sidewall edge of both the inner platform and the outer platform have a z-shape.

13. A sectorized annular stator for a gas turbine, comprising:
the nozzle sector of claim 1.

14. A sectorized annular stator for a gas turbine, comprising:
the nozzle sector of claim 1,
wherein the first sidewall edge and the second sidewall edge of both the inner platform and the outer platform have a z-shape.

15. The sectorized annular stator of claim 11, wherein the nozzle sector comprises metal powder.

16. The sectorized annular stator of claim 11, wherein the nozzle sector comprise stainless steel.

17. The sectorized annular stator of claim 11, wherein the nozzle sector comprise super alloys.

18. The sectorized annular stator of claim 11, wherein the nozzle sector comprise aluminum.

19. A sectorized annular stator for a gas turbine, comprising:
a plurality of the nozzle sector of claim 1,
wherein at least two of the plurality of the nozzle sector are jointed at adjacent edges.

20. A sectorized annular stator for a gas turbine, comprising:
a plurality of the nozzle sector of claim 1,
wherein the plurality of the nozzle sector are arranged in a ring.

* * * * *